United States Patent Office 3,325,555
Patented June 13, 1967

3,325,555
POLYFUNCTIONAL COMPOUNDS OF TETRAENES FROM CONJUGATED DIOLEFINS
Stanley E. Gebura, Overland Park, Kans., assignor to Monsanto Company, a corporation of Delaware
No Drawing. Filed Oct. 15, 1963, Ser. No. 316,442
8 Claims. (Cl. 260—677)

This invention relates to polyfunctional compounds and more particularly to polyfunctional compounds containing multiple conjugated diolefinic unsaturation.

It is accordingly an object of this invention to provide, as novel compositions of matter, a new class of polyfunctional compounds together with a method for their preparation.

Another object is the provision of a novel class of polyfunctional monomers.

A further object is the provision of a novel class of cross-linking or curing compounds for use in conjunction with vinyl and vinylidene resin systems.

These and other objects are attained through the provision of bis-(2-butadienyl-1,3) alkanes corresponding to the general structure:

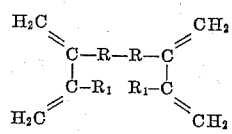

wherein each R is an independently selected alkyl radical of from 1 to 20 carbon atoms and each $R_1$ is independently selected from the class consisting of hydrogen and alkyl radicals of from 1 to 4 carbon atoms.

The following examples are given in illustration of the invention and are not intended as limitations thereon.

Example I 2 grams (ca. 0.08 mol) of magnesium turnings and 50 ml. of diethyl ether are charged to a reactor equipped with a reflux condenser. 15 grams (ca. 0.1 mol) of 2-bromomethyl-butadiene-1,3 are slowly added thereto over a 3 minute period and the resulting mixture is heated at reflux (ca. 35° C.) for 1 hour. On distillation of the final reaction mixture, there is recovered about 3 grams of a light viscous fluid identified by elemental analysis and infrared spectroscopy as 1,2-bis-(2-butadienyl-1,3) ethane; i.e., corresponding to the structure:

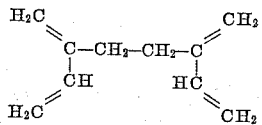

Example II 6 grams (ca. 0.09 mol) of powdered zinc and 80 ml. of tetrahydrofuran are charged to a reactor equipped with a reflux condenser. 12 grams (ca. 0.1 mol) of 2-chloromethyl-3-methyl butadiene-1,3 are slowly added thereto over a 2 minute period and the resulting mixture is heated at reflux (ca. 65° C.) for one hour. On distillation of the final reaction mixture, there is recovered about 7 grams of a light viscous fluid identified by elemental analysis and infrared spectroscopy as 1,2-bis-(2-methyl-3-butadienyl-1,3) ethane; i.e., corresponding to the structure:

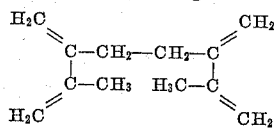

Example III 2 grams (ca. 0.085 mol) of sodium and 50 ml. of tetrahydrofuran are charged to a reactor equipped with a reflux condenser. 12 grams (ca. 0.1 mol) of 2-(2-chloroethyl)-butadiene-1,3 are slowly added thereto over a 2 minute period and the resulting mixture is heated at reflux (ca. 65° C.) for 1 hour. On distillation of the final reaction mixture, there is recovered about 7 grams of a viscous fluid identified by elemental analysis and infrared spectroscopy as 1,4-bis-(2-butadienyl-1,3) butane; i.e., corresponding to the structure:

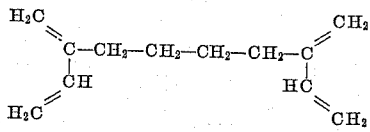

Example IV 18 grams (ca. 0.09 mol) of mercury and 80 ml. of tetrahydrofuran are charged to a reactor equipped with a reflux condenser. 16 grams (ca. 0.1 mol) of 2-n-butyl-3-chloromethyl-butadiene-1,3 are slowly added thereto over a 3 minute period and the resulting mixture is heated at reflux (ca. 65° C.) for 1 hour. On distillation of the final reaction mixture, there is recovered about 10 grams of a viscous fluid identified by elemental analysis and infrared spectroscopy as 1,2-bis-(2-butyl-3-butadienyl-1,3-) ethane; i.e., corresponding to the structure:

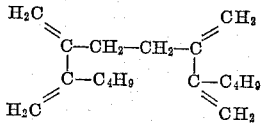

Example V 2 grams (ca. 0.08 mol) of magnesium turnings and 100 ml. of tetrahydrofuran are charged to a reactor equipped with a reflux condenser. 17 grams (ca. 0.1 mol) of 2-(6-chloro-n-hexyl)-butadiene-1,3 are slowly added thereto over a 3 minute period and the resulting mixture is heated at reflux (ca. 65° C.) for 2 hours. On distillation of the final reaction mixtures, there is recovered about 10 grams of a viscous fluid identified by elemental analysis and infrared spectroscopy as 1,12-bis-(2-butadienyl-1,3)n-dodecane; i.e., corresponding to the structure:

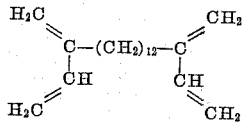

Example VI 2 grams (ca. 0.08 mol) of magnesium turnings and 80 ml. of dipropylether are charged to a reactor equipped with a reflux condenser. 14 grams (ca. 0.1 mol) of 2-(1-chloro-n-butyl)-butadiene-1,3 are slowly added thereto over a 2 minute period and the resulting mixture is heated at reflux (ca. 90° C.) for 90 minutes. On distillation of the final reaction mixture, there is recovered about 8 grams of a viscous fluid identified by elemental analysis and infrared spectroscopy as 4,5-bis-(2-butadienyl-1,3) octane; i.e., corresponding to the structure:

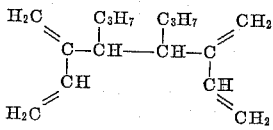

The products of this invention are bis-(2-butadienyl-1,3) alkanes corresponding to the general structure:

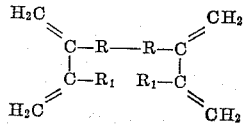

where R and $R_1$ are as heretofore described. Thus, each R may be, independently, for example, methyl, ethyl, propyl, isopropyl, n-butyl, secondarybutyl, tertiarybutyl, amyl, hexyl, heptyl, octyl, isooctyl, decyl, dodecyl, eicosyl, etc., and each $R_1$ may be, independently, for example, hydrogen, methyl, ethyl, propyl, isopropyl, n-butyl, secondarybutyl, tertiarylbutyl, etc.

The products of this invention are obtained by contacting a 2-haloalkyl-butadiene-1,3 corresponding to the general structure:

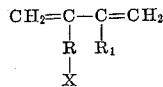

with a halide complexing metal. In the above formula, R and $R_1$ are as heretofore disclosed. Where both R groups and both $R_1$ groups of the products of this invention are the same, a single 2-haloalkyl-butadiene-1,3 compound is used. However, mixtures of such compounds may be employed to prepare polyfunctional compounds wherein the R groups and the $R_1$ groups are dissimilar. Suitable 2-haloalkyl-butadienyl-1,3 compounds which may be substituted with equivalent results for those employed in the examples, include: 2-chloromethyl-3-alkyl-butadiene-1,3 compounds of the homologous series of from 2-chloromethyl-3-methyl-butadiene-1,3 through 2-chloromethyl-3-n-butyl-butadiene-1,3; 2-bromoalkyl-butadiene-1,3 compounds of the homologous series of from 2-bromomethyl-butadiene-1,3 through 2-(20-bromoeicosyl)-butadiene-1,3; 2-fluromethyl-butadiene-1,3; 2-iodomethylbutadiene-1,3; 2-chloroethyl-butadiene-1,3; 2-chloroethyl-3-methyl-butadiene-1,3; 2-chloroethyl-3-ethyl-butadiene-1,3; etc. Mixtures thereof may be employed.

Any metal may be used which is capable of complexing with the halogen of the 2-haloalkyl-butadiene-1,3 compound to effect coupling thereof according to the reaction

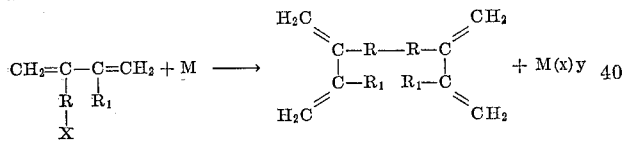

wherein M is the metal. The stoichiometry isn't shown in the above reaction since that, of course, will depend upon the particular metal chosen. One of the best known halide complexing metals is, of course, magnesium which combines with haloorganic compounds to form the Grignard complex, R—MgX, which then can coreact with other haloorganic molecules, R—X, splitting out $MgX_2$ and coupling the organic residue molecules, R—R. Other metals known to function in like manner and which may be used in the practice of this invention include, for example, zinc, mercury, alkali metals such as sodium, potassium, lithium, etc.

The reaction is generally effected in the presence of an inert solvent at temperatures of from about 0° C. to about 250° C. Solvents such as diethyl ether or the higher dialkyl ethers, tetrahydrofuran, etc. may be used.

The bis-(2-butadienyl-1,3) alkanes of this invention are useful as monomers which may be polymerized to form thermoset polymers; the polymerization and forming being effected simultaneously, e.g., using spinning or casting techniques. In this manner may be fabricated threads, rods, castings of various useful shapes, etc. In another application, the bis(2-butadienyl-1,3) alkanes of this invention are monomers containing multiple diene functionality capable of copolymerization with other vinyl or vinylidene monomers. The resulting copolymers are rigid thermoset resins. Examples of suitable vinyl or vinylidene monomers so copolymerizable therewith include alpha-olefins such as ethylene, propylene, etc.; styrenes such as styrene or the alpha- or ring-substituted halo or alkyl derivatives thereof; acrylic or methacrylic acid and their esters; vinyl and vinylidene halides; acrylonitrile; etc.

It is obvious that many variations may be made in the products and processes set forth above without departing from the spirit and scope of this invention.

What is claimed is:

1. A class of bis-(2-butadienyl-1,3) alkanes corresponding to the general structure

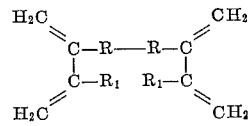

wherein each R is an independently selected alkyl radical of from 1 to 20 carbon atoms and each $R_1$ is independently selected from the class consisting of hydrogen and alkyl radicals of from 1 to 4 carbon atoms.

2. 1,2-bis-(2-butadienyl-1,3) ethane.
3. 1,2-bis-(2-methyl-3-butadienyl-1,3) ethane.
4. 1,4-bis-(2-butadienyl-1,3) butane.
5. 1,2-bis-(2-butyl-3-butadienyl-1,3) ethane.
6. 1,12-bis-(2-butadienyl-1,3) dodecane.
7. 4,5-bis(2-butadienyl-1,3) octane.
8. A process for the preparation of bis-(2-butadienyl-1,3) alkanes corresponding to the general structure

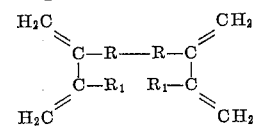

which comprises contacting a conjugated diolefin corresponding to the general structure

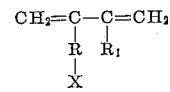

with a halide complexing metal; wherein in each of the above formulae, each R is an independently selected alkyl radical of from 1 to 20 carbon atoms and each $R_1$ is independently selected from the class consisting of hydrogen and alkyl radicals of from 1 to 4 carbon atoms.

No references cited.

DELBERT E. GANTZ, *Primary Examiner.*

G. E. SCHMITKONS, *Assistant Examiner.*